Patented Dec. 3, 1946

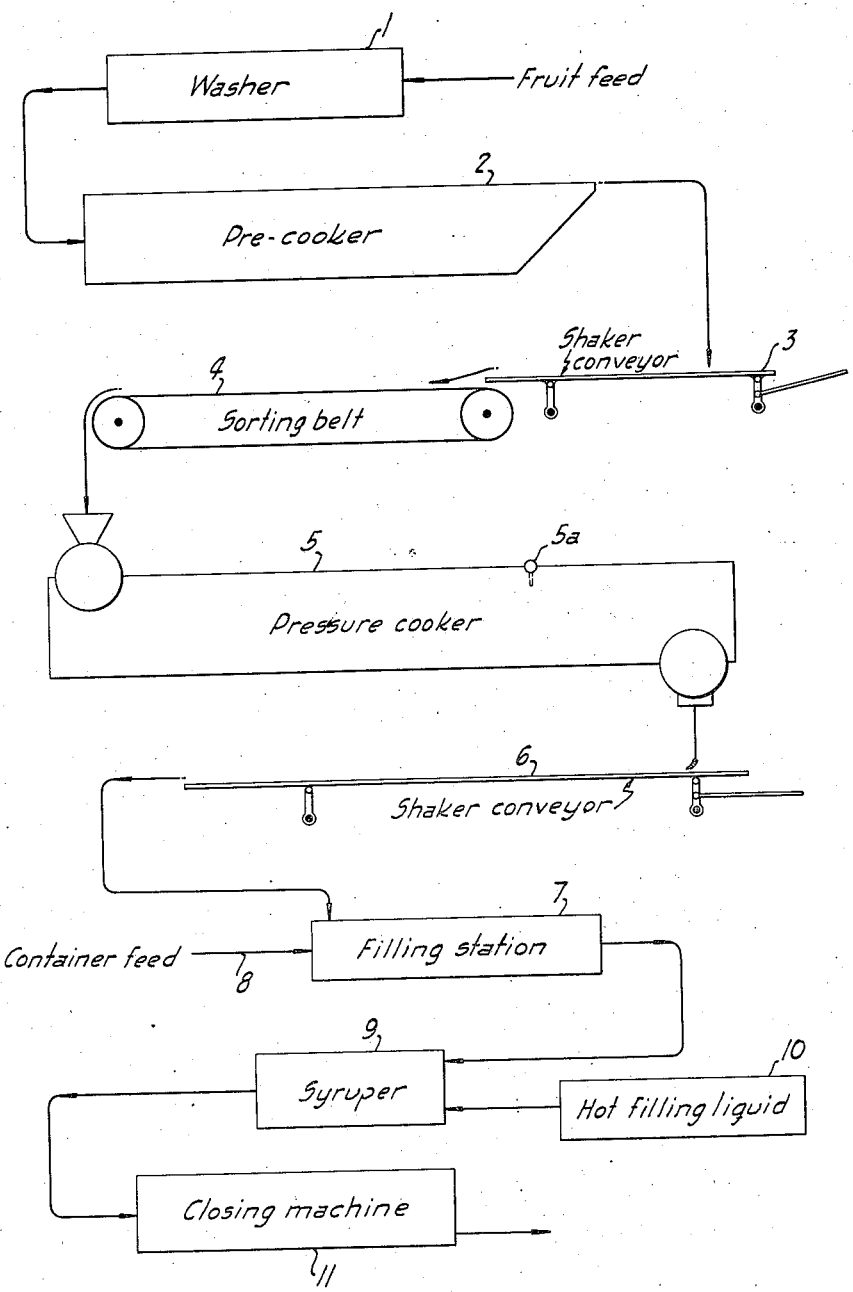

2,411,896

UNITED STATES PATENT OFFICE 2,411,896

DRIED FRUIT PACKAGING

Burnell E. Richmond and Paul C. Wilbur, San Jose, Calif., assignors to Richmond-Chase Co., San Jose, Calif., a corporation of California Application March 18, 1942, Serial No. 435,226

3 Claims. (Cl. 99—186)

This invention is concerned with the packaging of dried fruit such as prunes, raisins, and figs in liquid, and relates more particularly to the provision of a continuous process wherein the fruit is subjected to a sequence of related and controlled steps to produce packaged dried fruit in liquid of improved quality and at a substantially reduced cost.

Under conventional dried fruit canning processes as employed in connection with prunes, for example, the fruit is first washed and sorted and then placed in desired amounts in the can and covered with a syrup. The can is then exhausted and sealed, and thereafter subjected to a cooking or sterilization operation, usually in boiling water. The length of cook is determined by whether heating is effected by convection or conduction. With convection heating, a cook of about one hour is sufficient. When conduction heating is required because of insufficient liquid in the pack for convection heating a much longer cooking time is required. This process has resulted in a product which is unsatisfactory in many respects so that widespread sale of the product has not been possible.

Sterilizing operations of the above character employ the syrup in the can as the heat transfer medium from the can to the fruit in the can. This forms a natural limit to the ratio of fruit and syrup. Unless the syrup is large in relation to the amount of fruit, the pieces of fruit near the can wall are subjected to more heat than the pieces of fruit in the central part of the can, particularly in large sized cans, so that a non-uniform treatment of the fruit always results. The pieces of fruit near the wall of the can will be overheated and will be of darker flesh and show evidence of overcooking in relation to the pieces of fruit in the center of the can. The uneven heating within the can produces differences in the amount of swelling and softening of the fruit so that a non-uniform product is obtained and relatively tough and relatively tender prunes will be found in the same can. Because of the difference in heating in different parts of the can and because of the swelling of the fruit which is carried out in the can, non-uniform swelling of the fruit results.

The necessity for a high fill ratio of syrup to fruit where the dried fruit is sterilized in the can by convection heating causes an excessive loss of the acid, sugar and other soluble constituents from the dried fruit to the syrup, so that the fruit does not have the full flavor and nutritive content which is desired. Such losses will always occur because convection heating in sterilization precludes any substantial variation of the fruit-syrup ratio.

In addition, certain pieces of dried fruit have latent characteristics which are not apparent upon inspection but which will lead to uneven softening where the cooking is done in the can. Because the softening of dried fruit is a time and temperature effect, the greater resistance of a part of the fruit to softening requires a longer cook and therefore serves to increase the loss of desirable constituents from the fruit to the syrup, as well as to darken the flesh color of the fruit unduly.

The exhausting step is required in the conventional process to remove dissolved and entrained air from the contents of the can and this produces undesirable corrosive effects on the tin plate of the can by the hot fruit acids present. After the exhausting step, the tin plate is darkened and etched where it has contacted fruit acid. Corrosion during exhaustion is accelerated at the surface level of liquid in the can where a zone of aerated corrosion exists.

Our process eliminates or minimizes the undesirable results connected with conventional processes of packaging dried fruit in syrup and provides a processing operation which results in a packaged dried fruit in liquid of a substantially improved and uniform quality. As will be noted, our process enables continuous large scale packing operations with accurate, selective control of the processing factors which provide the improved characteristics of the final product and enable a degree of selection and control of such characteristics.

In general, our process provides a controlled sequence of steps including cooking the fruit, filling hot fruit and hot liquid in the desired form of package, sealing the packages, and subsequent controlled cooling of the sealed packages. Other necessary but uncritical steps such as a preliminary washing of the fruit, check-weighing of filled packages, labelling and casing, may be employed where required.

The cooking of the fruit is preferably carried out in two steps, a preliminary cooking operation in boiling water and a subsequent pressure cooking operation under controlled time, temperature and pressure conditions. These operations are preferably carried out continuously and the fruit is continuously conveyed from the cooker to the filling and weighing stations and then to a syruping station where hot liquid at a temperature related to the temperature of the fruit from the cooking operation is added, after which the cans are immediately sealed. Afterwards, a controlled cooling or temperature holding step can be performed where desired in accordance with the type of end product which is required.

A continuous processing of the above character where proper control and relation is maintained between the time of cooking both in the preliminary cooking and pressure cooking with respect to the desired temperature of the fruit at the time it is placed in the package, together with a control of the temperature of the filling liquid and its amount so that the heat of the fruit and the filling liquid is sufficient to sterilize the package, results in a number of distinctly new and advantageous results not obtained by prior processing.

In the first place, the character of the cooking operation provides a uniform treatment of each piece of fruit with precisely controllable softening and swelling before the fruit is placed in the package. This feature enables accurate control and predetermining of the fruit-syrup ratio within any desired limits so that the desired amount of liquid can be added in each package in proportion to the amount of fruit therein and is not regulated or affected by sterilizing considerations.

The cooking procedure results directly in an improved color and flavor of the fruit by enabling an accurate and desirable control of caramelization in its relation to the softening of the fruit. Caramelization (and its resultant changes in the flavor and color of the fruit flesh) and softening are a function of time and temperature of cooking and the rate of caramelization and softening increases with the temperature. We have discovered that the rate of softening increases more rapidly with temperature than the caramelizing rate. As a result, by selecting an appropriate temperature above 212° F. an appropriate time of treatment, the desired softening can be obtained with an accompanying minimized caramelization well below that resulting from conventional cooking procedures and with a consequent improved flesh color and flavor. The desired softening is obtained within the short cooking time employed even with the pieces of fruit normally more resistant to softening.

The short cooking time of this process also reduces the injury to the fruit which occurs where long periods of agitation under heat are employed. Our cooking process, therefore, lends itself to obtaining a uniform product of improved characteristics wherein there are less observable differences between the fruit in different packages or within the same package whether from the same batch or not as long as the cooking and filling conditions are similarly controlled.

Our process eliminates the usual exhausting steps because entrained or dissolved air is removed from the filling liquid in its preheating, and the usual corrosion of the tin cans resulting from exhausting is not evident by inspection of tin cans when used as the packaging medium in our process. Our packing procedure in filling hot fruit and liquid enables a high vacuum in the sealed can and resultant increase in the life of the can. A similar vacuum under conventional exhausting procedure would require a substantial increase in the time of exhausting and a consequent increase in the time during which aerated corrosion exists in the can.

The processing as described herein has numerous other advantages which will be apparent from the description of the process.

The drawing shows schematically a flow diagram of the process disclosed herein.

As previously stated, the present process is preferably continuous and, therefore, is carried out by establishing a flow of the fruit to be processed. As seen in the drawing, the fruit is first subjected to a conventional washing step as indicated at 1, from which it is conveyed without interrupting its progress to a cooker 2 of a conventional type in which the fruit is conveyed through a bath of boiling water for the desired time. The speed of travel through the precooker is controlled in accordance with the desired moisture content during the subsequent pressure cooking step and the character and kind of fruit being processed. Usually the preliminary cooking at 212° F. can be effected in from 3½ to 15 minutes. This preliminary cooking provides an initial softening of the fruit and a certain amount of swelling and consequent moisture absorption to enable easier penetration of heat during the pressure cooking step.

After the precooking, if desired, excess moisture may be removed as indicated at 3 which may be effected on conventional equipment, for example a shaker screen. This step is desirable to insure even treatment of the fruit in the pressure cooker by taking away the mechanically removable surface moisture on the fruit.

After the moisture removal step the fruit is sorted to remove the defective pieces, for example as indicated at 4, by passing on suitable sorting belts where operators can inspect and remove defective fruit. The sorting operation can be effected satisfactorily with a length of belt and a speed to provide a travel of about 20 seconds duration so that loss of heat is minimized.

From the sorting operation the fruit is conveyed preferably in a shallow layer through a pressure cooker 5 having an automatic thermostat control 5a. In the pressure cooker the fruit is subjected to steam under pressure for a controlled length of time in accordance with the desired characteristics of the fruit and the particular kind and character of fruit being processed.

Satisfactory results as to tenderness, softening and subsequent temperature maintenance can be obtained by subjecting the fruit to dry saturated steam at a temperature range of from 220° F. (2.5 lbs. gauge pressure) to 260° F. (20.7 lbs. gauge pressure) during an interval of from one to four minutes. With prunes, good results have been obtained from cooking at about 228° F. (5 lbs. gauge pressure) for about three minutes. In general, the temperature selected should be such as to provide a temperature of the fruit at the time of closing the packages of at least about 170° F. to 190° F. The minimum safe temperature at closing is determined by the subsequent treatment employed.

The pressure cooking step further conditions the fruit for proper and rapid absorption of liquid when it is subsequently placed with the liquid in the package. In accordance with usual trade practice and as required by Federal specifications, the drained weight of dried fruit packed in syrup is measured not less than thirty days after sealing of the package. With our process, absorption proceeds at a high rate which is from three to four times as fast as absorption under conventional process. As a result, the fruit reaches its full degree of swelling in a much shorter time so that the packaged fruit is ready for marking soon after packaging and storage requirements are minimized. With prunes, the drained weight can be determined with sufficient accuracy after about two days.

In the preferred form of pressure cooker, the fruit is continuously introduced and withdrawn from the cooker in small measured batches by means of respective intake and discharge valves so that it is quickly placed into the cooker and is quickly withdrawn. The quick withdrawal of the fruit further aids tenderness because the instantaneous release of pressure within each piece of fruit at the end of the pressure cook substantially results in a miniature explosion of the fruit. The exploding action is of sufficient intensity to result in largely smoothing out for an interval the normally wrinkled surface of the fruit. This exploding action contributes to the more rapid moisture absorption and the greater softness of the fruit.

In addition, the pressure cooking operation provides a reservoir of heat within the individual piece of fruit so that its temperature will be maintained above a sterilizing temperature through its subsequent travel along the processing equipment until the package is sealed. Usually this travel will occupy less than one to three minutes. Pressure cooking at high temperature in a continuous fashion enables control and correlation of the sequential cooking, conveying and filling operations so that effective sterilization of the package can be obtained from the heat in the fruit and the filling liquid. The desired temperature to which the fruit is raised within the pressure cooker is preferably such that sufficient heat will be present to maintain the desired temperature even during temporary interruptions of the continuous flow of product.

After the pressure cooking operation, the prunes are conveyed as by a shaker conveyor 6 to a filling station 7 to which a series of packages or containers are also conveyed as indicated at 8. At the filling station the desired measured amount of prunes is placed in the cans in any convenient manner, either manually or by filling machines. Only a short time is required for these operations and usually the prunes will be in the containers ready for syruping in from 10 to 35 seconds after leaving the pressure cooker.

After the filling operation, the filled packages are conveyed continuously to a syruping station 9 where hot filling liquid or syrup in a desired proportion from a temperature controlled source 10 is placed in the package with the fruit and the package is immediately carried to a closing machine 11 and sealed. The temperature of the filling liquid should be maintained above a sterilizing temperature, and the limits of this temperature depend to some extent on the average temperature of prunes at the time of filling and on the subsequent management of the packages during the cooling step and on the fruit itself. Usually a temperature of the filling liquid within the range of 180° F. to 200° F. or over can be selected, depending upon the rate of cooling, and the internal vacuum desired after cooling. The use of hot filling liquid provides a substantially air-free syrup in the package.

By proper control of the temperatures of the fruit and the syrup, the degree of vacuum in the package can be controlled, and higher vacuums are possible than with conventional exhausting procedure.

With both the liquid and the fruit at or above the sterilizing temperature, the sterilizing of the package is performed by the fruit and the liquid themselves. The liquid being hot contains a minimum of entrained and dissolved air; also the hot vapors rising in the head space in the package at the moment of sealing operation insures a substantial exclusion of air from within the package.

After the packages are sealed, they are subjected to a cooling operation. The sterilizing of the package is completed shortly after it is sealed, and the further cooling treatment of the packaged fruit can be independent of the sterilizing operation. As a result, a wide range of cooling procedure is available—from rapid water cooling to slow, temperature holding operations. This cooling can be used to further control the color, softness and other characteristics of the fruit. With slower cooling, softer and darker fruit is obtained.

The filling liquid can be either the conventional sugar syrup or water. If desired, the syrup can be made isotonic with respect to the fruit so that there will be no reduction of the sugar content of the fruit by the liquid.

The package or container employed can be of any desired type. Tin cans or glass containers can be employed. Where a carton pack is desired, it is preferred to employ a heat-sealing container of synthetic thermoplastic material in a non-porous sheet form. Such materials should be chemically inert to fruit acids and impervious to the passage of water or bacteria. "Pliofilm," moisture-proof "Cellophane," or similar material may be employed.

Thin thermoplastic sheets of the above character are very resistant to heat conduction, and often must be strengthened by lamination to sheets of proper material also having a very low heat conduction. Frequently, the strengthening materials, as well as certain thermoplastics, are susceptible to the action of hot vapors so that long conventional sterilizing operations performed after sealing can not be employed satisfactorily because of harmful effects on the material of the container and because an unduly long time is required to obtain a sufficient flow of heat through the container to the fruit. The process herein disclosed lends itself readily to the use of such thermoplastic materials and enables efficient, economical packaging with such materials.

It will be noted that the above process provides complete control of the temperature, pressure and time relations throughout the process so that any desired processing of the fruit can be effected with the assurance that a uniform treated product will be obtained. At the same time that the uniformity of product is obtained so far as the cooking is concerned, the continuous process as described allows maintenance of an accurate temperature control up to the filling operation, together with filling of a desired amount of liquid, ranging from complete covering of the fruit as employed in conventional processes to as little as 25% or less of liquid to fruit by volume. If a solid pack fruit is desired, the amount of liquid added may be made equal to that absorbed by the fruit as disclosed in said application. These controls in effect enable "tailoring" of the product to suit specific markets while providing a uniform product of whatever character desired. It is to be particularly noted that it is the correlation of the time, temperature and syrup-liquid ratio from the beginning to the end of the process which provides the desired results of increased tenderness, improved color and flavor in the final product.

We claim:

1. A process of preparing a wet pack comprising free liquid and individual pieces of previously dried fruit such as prunes, said process comprising subjecting the individual pieces of fruit to direct contact with steam substantially at a temperature from about 220° F. to about 260° F. for a period substantially from about one to about four minutes, then placing the fruit together with hot liquid into a container, and then sealing the container.

2. A process of preparing a wet pack comprising free liquid and individual pieces of previously dried fruit such as prunes, said process comprising subjecting the individual pieces of fruit to direct contact with steam substantially at a temperature from about 220° F. to about 260° F., then placing the fruit in a container while at a temperature substantially from about 170° F. to about 190° F. and also placing in the container hot liquid at a temperature substantially at least 180° F., and then sealing the container.

3. A process of preparing a wet pack comprising free liquid and individual pieces of previously dried fruit such as prunes, said process comprising pre-cooking the dried fruit in boiling water for from about three and one-half minutes to about fifteen minutes, then subjecting the individual pieces of fruit to direct contact with steam substantially at a temperature from about 220° F., to about 260° F. for a period substantially from about one to about four minutes, then placing the fruit together with hot liquid into a container, and then sealing the container.

BURNELL E. RICHMOND.
PAUL C. WILBUR.